(12) United States Patent
Yokoyama et al.

(10) Patent No.: US 10,596,938 B2
(45) Date of Patent: Mar. 24, 2020

(54) VEHICLE SEAT

(71) Applicant: TACHI-S CO., LTD., Tokyo (JP)

(72) Inventors: Tomoko Yokoyama, Tokyo (JP); Takashi Inoue, Tokyo (JP)

(73) Assignee: TACHI-S CO., LTD., Tokyo (JP)

(*) Notice: Subject to any disclaimer, the term of this patent is extended or adjusted under 35 U.S.C. 154(b) by 7 days.

(21) Appl. No.: 15/956,969

(22) Filed: Apr. 19, 2018

(65) Prior Publication Data

US 2018/0304781 A1    Oct. 25, 2018

(30) Foreign Application Priority Data

Apr. 21, 2017   (JP) ................................. 2017-084711

(51) Int. Cl.
*B60N 2/58* (2006.01)
*B60N 2/16* (2006.01)
*B60N 2/06* (2006.01)

(52) U.S. Cl.
CPC ............. *B60N 2/58* (2013.01); *B60N 2/06* (2013.01); *B60N 2/16* (2013.01)

(58) Field of Classification Search
CPC .............. B60N 2/58; B60N 2/06; B60N 2/16
USPC ...................................................... 297/463.1
See application file for complete search history.

(56) References Cited

U.S. PATENT DOCUMENTS

| 7,918,511 B2* | 4/2011 | Hibi | ..................... B60N 2/6009 |
| | | | 297/182 |
| 8,011,732 B2* | 9/2011 | Lindsay | ..................... 297/463.1 |

FOREIGN PATENT DOCUMENTS

JP   2011-225170 A   11/2011

* cited by examiner

*Primary Examiner* — Anthony D Barfield
(74) *Attorney, Agent, or Firm* — Paratus Law Group, PLLC

(57) ABSTRACT

A vehicle seat includes: a seat cushion; a lower frame which supports the seat cushion to be lifted and lowered and to be advanced and retreated along a floor in conjunction with the lifting and lowering, a finisher which covers a lower side frame; and a flexible cover which is hung from the side portion of the seat cushion such that a lower edge part is engaged in the finisher, and is expanded and folded in accordance with the lifting and lowering of the seat cushion, wherein: the finisher includes a guiding part which guides the lower edge part of the cover to be movable in an advancing and retreating direction of the seat cushion; and the lower edge part of the cover includes a guided part which is engaged with the guiding part to be movable in the advancing and retreating direction of the seat cushion.

6 Claims, 14 Drawing Sheets

VEHICLE SEAT

CROSS-REFERENCE TO RELATED APPLICATION(S)

This application is based upon and claims the benefit of priority from Japanese Patent Application No. 2017-084711, filed on Apr. 21, 2017, the entire contents of which are incorporated herein by reference.

BACKGROUND

1. Field of the Invention

The present invention relates to a vehicle seat.

2. Description of the Related Art

As a vehicle seat mounted in a vehicle such as an automobile, a seat is known in which a seat cushion is lifted and lowered and is advanced and retreated along a floor in conjunction with the lifting and lowering (for example, see JP-A-2011-225170).

The seat described in JP-A-2011-225170 includes a lifter which lifts and lowers the seat cushion. The lifter includes a front link and a rear link rotatably supported by a lower side frame. When the front link and the rear link are rotated, the seat cushion is lifted and lowered, and is advanced and retreated along the floor in a seat front-and-rear direction in conjunction with the lifting and lowering.

The seat described in JP-A-2011-225170 further includes a flexible cover hung from the side portion of the seat cushion, and a sliding member supported by the lower side frame to be movable in a longitudinal direction of the lower side frame, that is, in the seat front-and-rear direction. The lower edge part of the cover is attached in the sliding member, and it is prevented that a hand of an occupant which presses the cover is inserted together with the cover into between the side portion of the seat cushion and the lower side frame, for example, in a case where the occupant unexpectedly presses the cover.

The sliding member is supported by the lower side frame to be movable in the seat front-and-rear direction, and the entire cover moves in the seat front-and-rear direction in accordance with the advance and the retreat of the seat cushion in the seat front-and-rear direction. Accordingly, a twist of the cover is prevented, and the cover is folded without disturbance in accordance with the descent of the seat cushion.

From a viewpoint for preventing insertion of the hand of the occupant or the like, desirably, the cover shields a gap between the side portion of the seat cushion and the lower side frame as much as possible.

However, in the seat described in JP-A-2011-225170, the sliding member in which the lower edge part of the cover is attached is guided by the lower side frame in the seat front-and-rear direction, and a moving range of the sliding member is restricted within the range over the entire length of the lower side frame. Further, since the cover moves integrally with the seat cushion in the seat front-and-rear direction, the length of the sliding member is restricted to be equal to or less than the length obtained by subtracting the moving amount of the seat cushion in the seat front-and-rear direction from the entire length of the lower side frame.

For this reason, for example, there is a risk that when the cover extends over the entire length of the lower side frame, the lower edge part of the cover is not held sufficiently, and the cover is turned up, so that the hand of the occupant is inserted into between the side portion of the seat cushion and the lower side frame. Further, there is a risk that when the cover is turned up, the end part of the lower side frame is exposed to cause a feeling of danger to the occupant.

SUMMARY

The invention has been made in consideration of the above situation, and an object thereof is to, in a vehicle seat in which a seat cushion is lifted and lowered and is advanced and retreated along a floor in conjunction with the lifting and lowering, prevent that a hand of an occupant or the like is inserted into between a side portion of the seat cushion and a lower side frame, thereby removing or reducing a feeling of danger felt by the occupant.

According to an aspect of the invention, there is provided a vehicle seat including: a seat cushion; a lower frame which supports the seat cushion to be lifted and lowered and to be advanced and retreated along a floor in conjunction with the lifting and lowering, the lower frame including a lower side frame arranged between a side portion of the seat cushion and the floor; a finisher which covers the lower side frame; and a flexible cover which is hung from the side portion of the seat cushion such that a lower edge part of the cover is engaged in the finisher, and is expanded and folded in accordance with the lifting and lowering of the seat cushion, wherein: the finisher includes a guiding part which guides the lower edge part of the cover to be movable in an advancing and retreating direction of the seat cushion; and the lower edge part of the cover includes a guided part which is engaged with the guiding part to be movable in the advancing and retreating direction of the seat cushion.

According to the invention, in the vehicle seat in which the seat cushion is lifted and lowered and is advanced and retreated along the floor in conjunction with the lifting and lowering, it is possible to prevent that the hand of the occupant or the like is inserted into between the side portion of the seat cushion and the lower side frame, and to remove or reduce the feeling of danger felt by the occupant.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
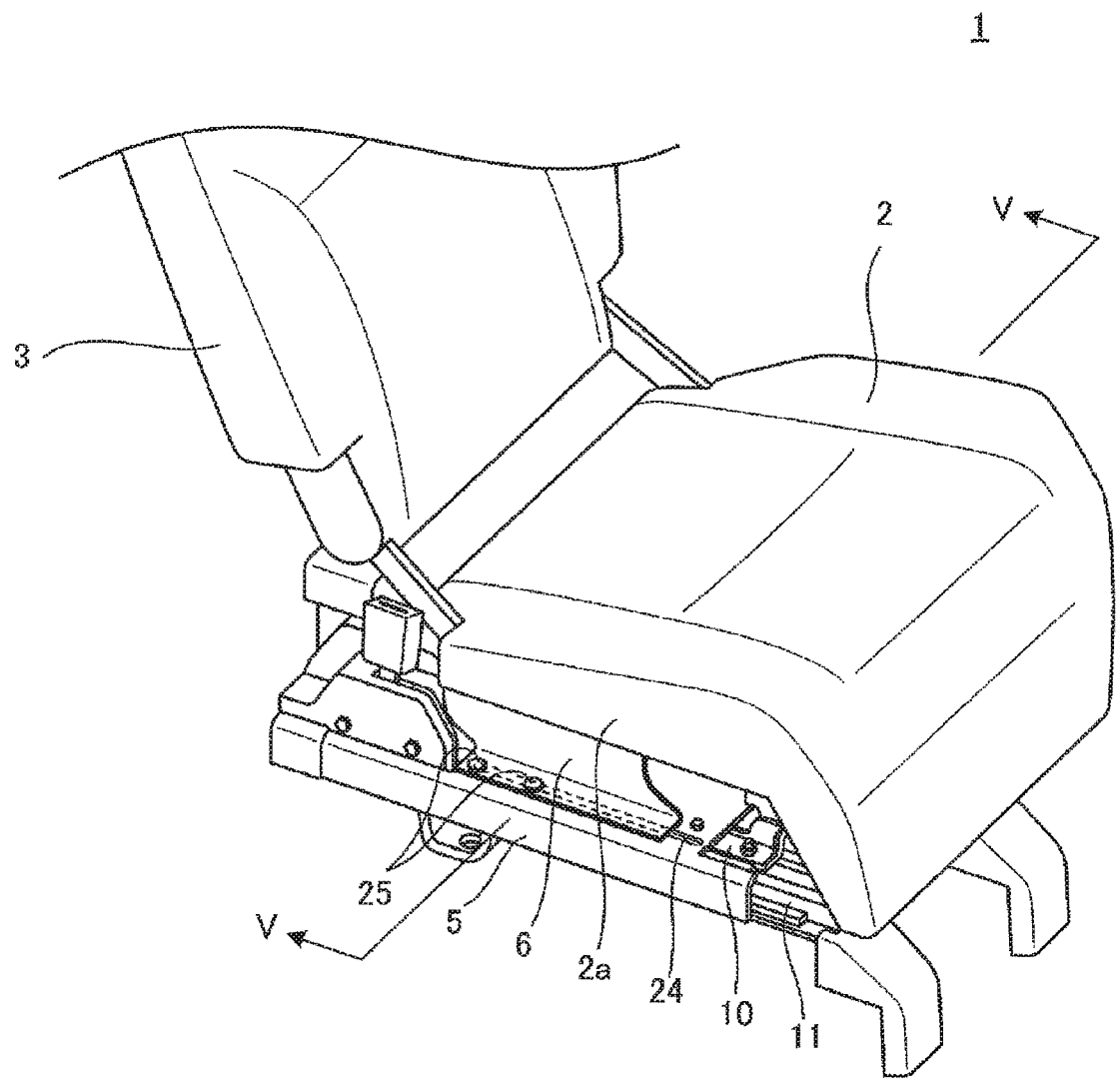
FIG. 1 is a perspective view illustrating one example of a vehicle seat for describing an embodiment of the invention in a state where a seat back is erected.
Figure 2:
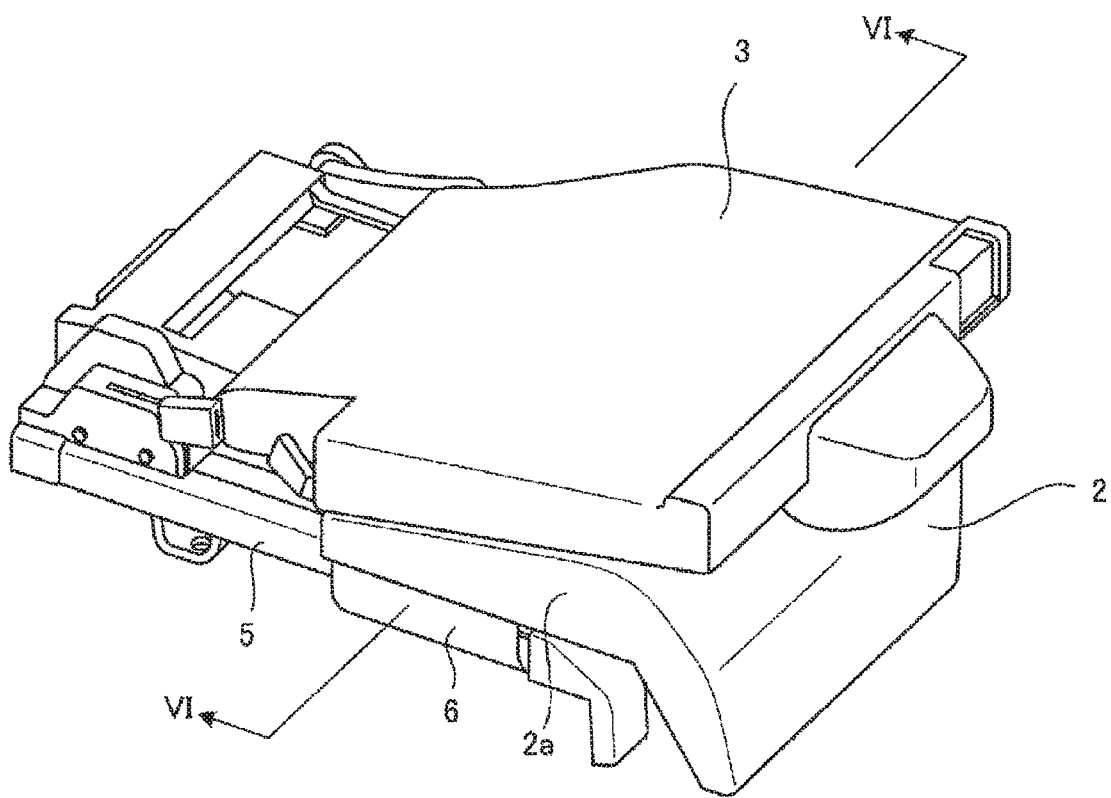
FIG. 2 is a perspective view illustrating a state where the seat back of the seat of FIG. 1 is tilted.
Figure 3:
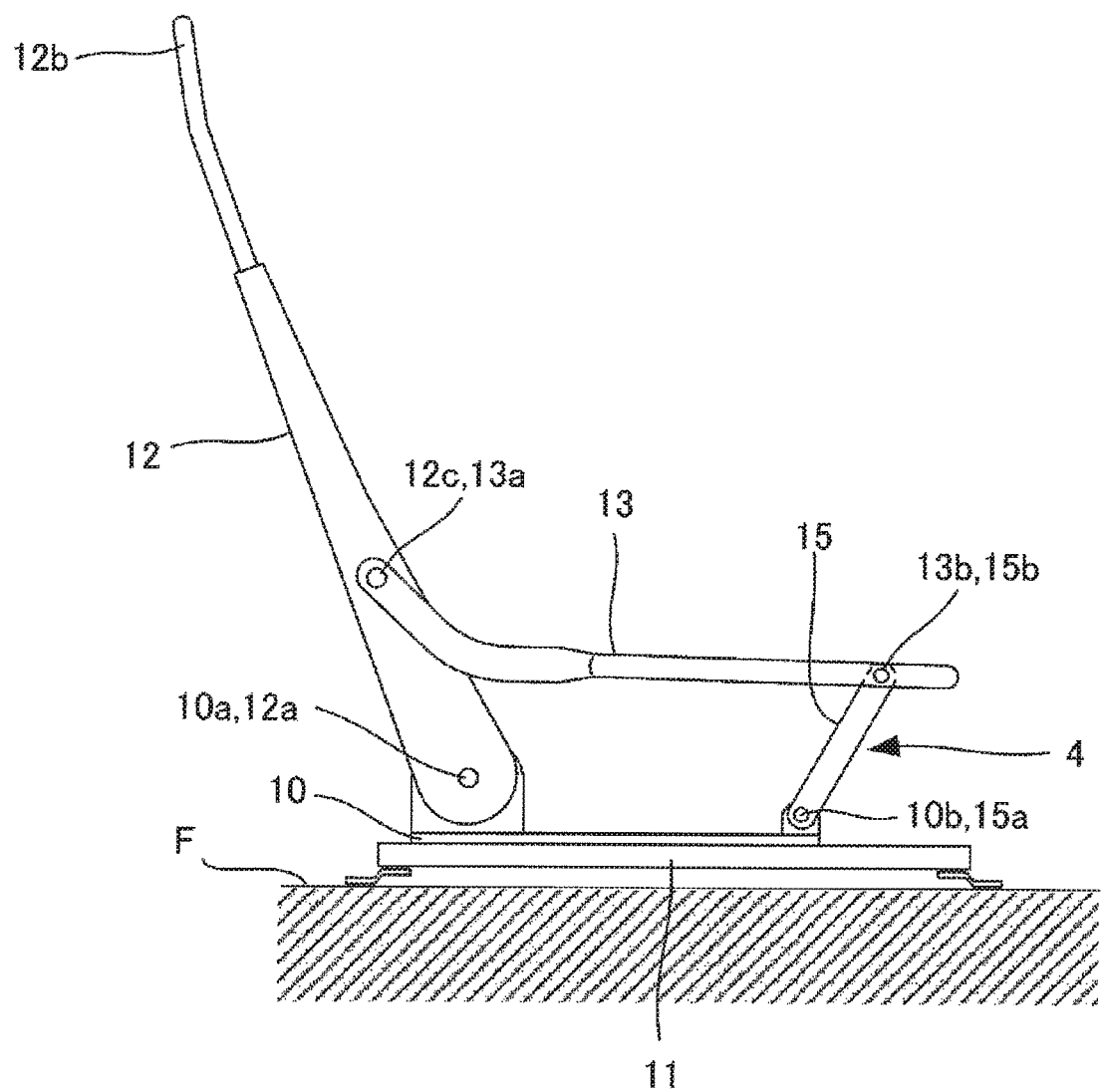
FIG. 3 is a schematic view illustrating a frame including a lower frame of the seat of FIG. 1.

FIGS. 1 and 2 illustrate one example of a vehicle seat for describing an embodiment of the invention. FIG. 3 illustrates a frame including the lower frame of the seat of FIG. 1.

A seat 1 illustrated in FIGS. 1 and 2 is a vehicle seat mounted in a vehicle such as an automobile, and includes a seat cushion 2, a seat back 3, and a lower frame 4 supporting the seat cushion 2 and the seat back 3.

The seat 1 is a so-called dive-down seat, and when the seat back 3 is tilted to a front side, the seat cushion 2 descends in accordance with the tilting of the seat back 3, and is moved forward along the floor F in conjunction with the descent. Accordingly, the seat back 3 is tilted such that the back surface of the seat back 3 is substantially in parallel with the floor F.

The lower frame 4 includes a lower side frame 10 which extends in the seat front-and-rear direction between a side portion 2a of the seat cushion 2 and the floor F, a cushion side frame 13 which is provided in the side portion 2a of the seat cushion 2 to extend in the seat front-and-rear direction, a back side frame 12 and a rotating arm 15 connecting the lower side frame 10 and the cushion side frame 13. A hinge is provided in each of connection parts including a connection part between the back side frame 12 and the lower side frame 10, a connection part between the back side frame 12 and the cushion side frame 13, a connection part between the rotating arm 15 and the lower side frame 10, and a connection part between the rotating arm 15 and the cushion side frame 13. In this example, the lower side frame 10 is supported by a slide rail 11 provided in the floor F. When the lower side frame 10 slides on the slide rail 11, the seat cushion 2 and the seat back 3 are slid integrally in the seat front-and-rear direction.

A lower end part 12a of the back side frame 12 of the seat back 3 is rotatably connected by the hinge to a rear end part 10a of the lower side frame 10, and the back side frame 12 is tilted to the front and rear sides with the lower end part 12a as a support point. Further, a lower end part 15a of the rotating arm 15 is rotatably connected by the hinge to a front end part 10b of the lower side frame 10, and the rotating arm 15 is also tilted to the front and rear sides with the lower end part 15a as a support point.

A rear end part 13a of the cushion side frame 13 of the seat cushion 2 is rotatably connected by the hinge to a connection part 12c between the lower end part 12a and the upper end part 12b of the back side frame 12. Further, a front end part 13b of the cushion side frame 13 is rotatably connected by the hinge to an upper end part 15b of the rotating arm 15.

As illustrated in FIG. 2, when the seat back 3 is tilted to the front side, the connection part 12c of the back side frame 12 descends along a circular arc track centered on the lower end part 12a (the rear end part 10a of the lower side frame 10) and is moved forward. Besides, the rotating arm 15 is driven via the cushion side frame 13, and the upper end part 15b of the rotating arm 15 descends along a circular arc track centered on the lower end part 15a (the front end part 10b of the lower side frame 10) and is moved forward.

In the cushion side frame 13, the rear end part 13a is connected to the connection part 12c of the back side frame 12, and the front end part 13b is connected in the upper end part 15b of the rotating arm 15. The cushion side frame 13 descends in a posture substantially parallel with the floor F, and is moved forward. In this manner, when the seat back 3 is tilted, the seat cushion 2 descends and moves forward along the floor F in conjunction with the descent.

On the other hand, when the seat back 3 is erected, the seat cushion 2 is lifted and is moved rearward along the floor F in conjunction with the lifting. The interval between the side portion 2a of the seat cushion 2 and the lower side frame 10 is enlarged in accordance with the lifting of the seat cushion 2. In order to prevent that the lower side frame 10 is exposed and to prevent that the hand of the occupant or the like is inserted into between the side portion 2a of the seat cushion 2 and the lower side frame 10, the seat 1 further includes a finisher 5 and a cover 6.

Figure 4:
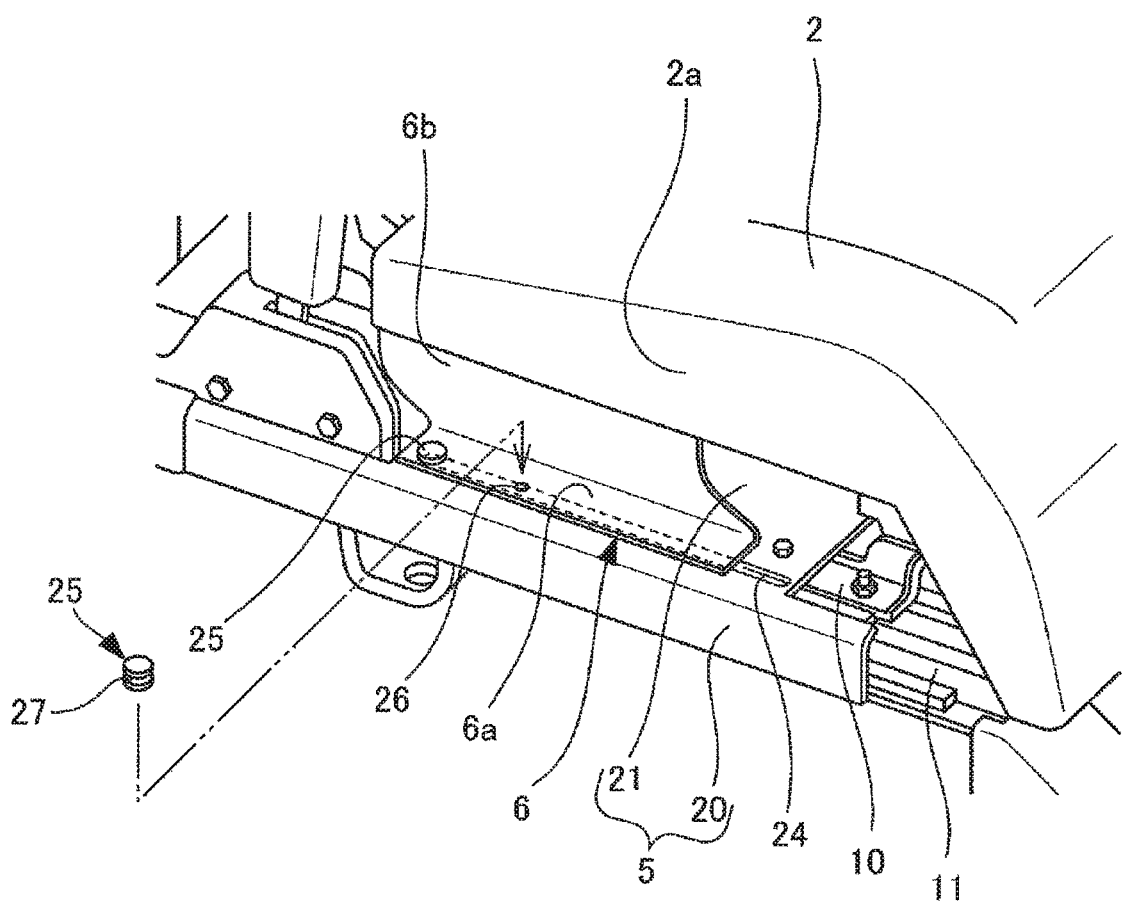
FIG. 4 is an enlarged perspective view illustrating a finisher and a cover of the seat of FIG. 1.

FIG. 4 illustrates the finisher 5 and the cover 6.

The finisher 5 is a rigid member made of a resin material such as ABS resin (Acrylonitrile Butadiene Styrene copolymerized resin), PP resin (Polypropylene resin), POM resin (Polyoxymethylene resin, Polyacetal resin), and PA resin (Polyamide resin), and is attached in the lower side frame 10. The finisher 5 includes a side plate part 20 arranged on the side of the lower side frame 10, and a top plate part 21 arranged on the upper side of the lower side frame 10. The side plate part 20 and the edge part of the top plate part 21 on the side plate part 20 extend beyond both ends of the lower side frame 10 along the lower side frame 10. The lower side frame 10 is covered over the entire length with the finisher 5. Incidentally, with respect to a pair of lower side frames 10 arranged with an interval provided in a seat width direction, the finisher 5 may be divided in the seat width direction to be provided in each of the lower side frames 10, or may be provided as a single-sheet structure across the pair of lower side frames 10 as described in this example.

The cover 6 is a flexible sheet-shaped member made of non-woven cloth or the like, and is hung from the side portion 2a of the seat cushion 2. Further, a lower edge part 6a of the cover 6 is engaged in the finisher 5. The finisher 5 includes a guiding part as an engaging part to be engaged with the lower edge part 6a of the cover 6, and the lower edge part 6a of the cover 6 includes a guided part as an engaging part to be engaged with the finisher 5.

In this example, the guiding part of the finisher 5 is configured by a slit 24. The slit 24 is provided in the top plate part 21, and extends in the seat front-and-rear direction, that is, the advancing and retreating direction of the seat cushion 2 in which the seat cushion 2 advances and retreats along the floor F in conjunction with the lifting and lowering.

In this example, the guided part of the cover 6 is configured by a plurality of pins 25. In the lower edge part 6a of the cover 6, a plurality of attachment holes 26 are provided with a proper interval provided in the seat front-and-rear direction. The pin 25 is inserted into each of the attachment holes 26, and is further inserted in the slit 24 of the finisher 5. The annular groove 27 is provided in the outer circumference of the pin 25. When the edge of the attachment hole 26 and the edge of the slit 24 are pinched in the annular groove 27, the pin 25 is attached in the lower edge part 6a, and is engaged in the slit 24 to be movable in the longitudinal direction of the slit 24.

The seat cushion 2 is moved forward along the floor F in accordance with the tilting of the seat back 3 to the front side. At that time, an upper edge part 6b of the cover 6 which is joined with the side portion 2a of the seat cushion 2 is moved forward integrally with the seat cushion 2. Further, by engaging the slit 24 and the pin 25, the lower edge part 6a of the cover 6 is guided to be movable in the seat front-and-rear direction. The lower edge part 6a is pulled by the upper edge part 6b to move forward together. In this manner, the entire cover 6 is moved forward. Accordingly, the twist of the cover 6 is prevented.

Figure 5:
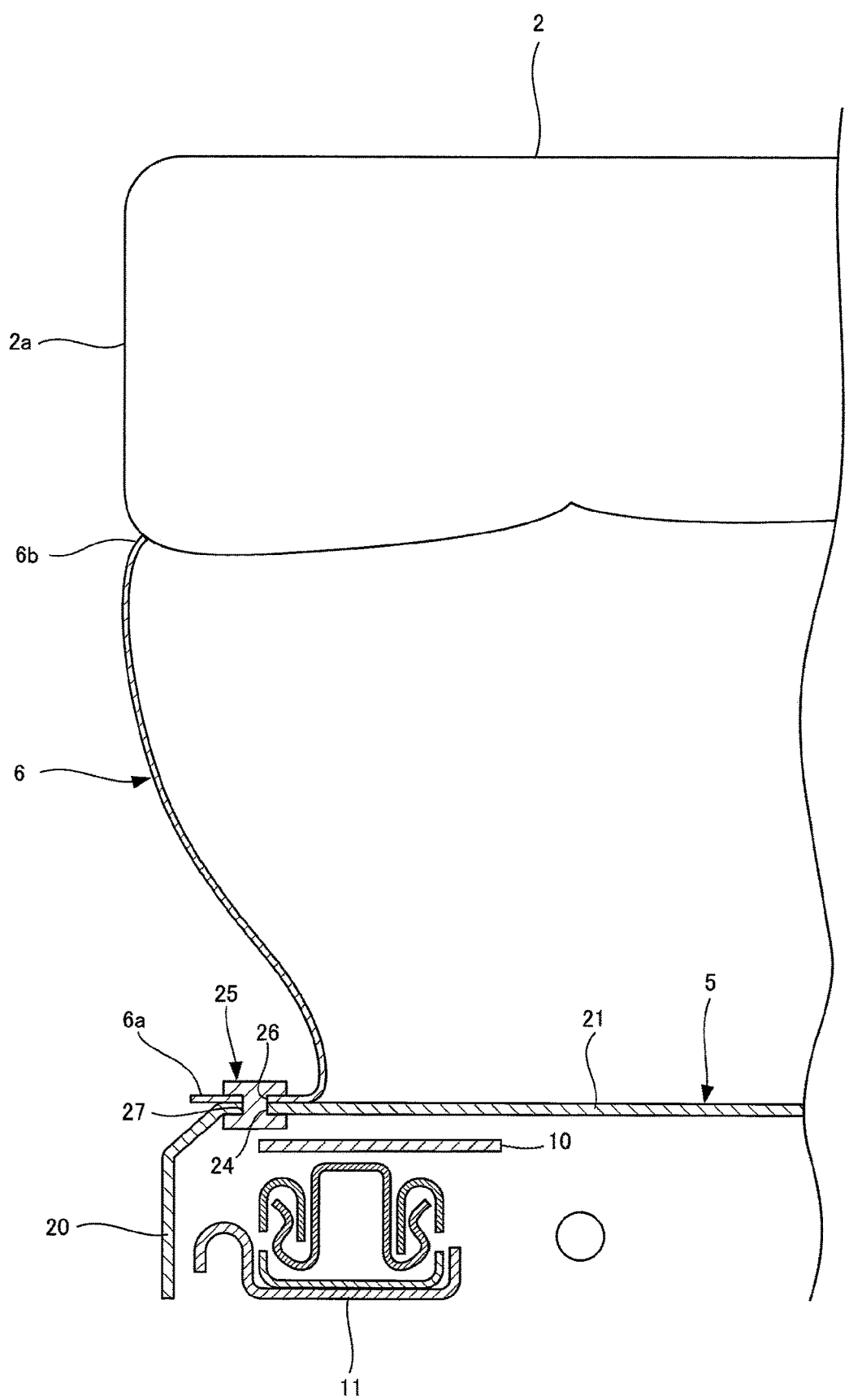
FIG. 5 is a sectional view taken along line V-V of FIG. 1.
Figure 6:
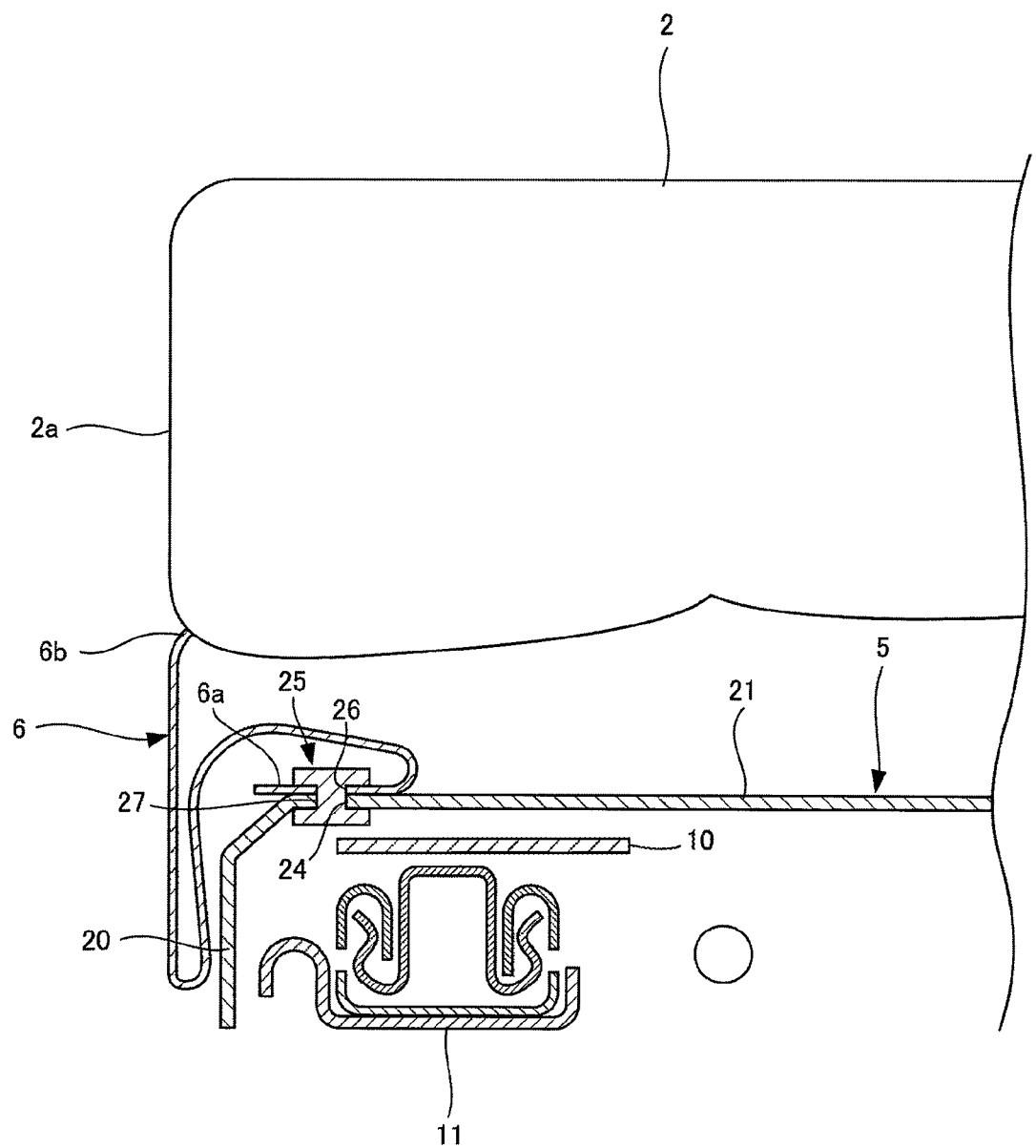
FIG. 6 is a sectional view taken along line VI-VI of FIG. 2.

The seat cushion 2 descends in accordance with the tilting of the seat back 3 to the front side. As illustrated in FIGS. 5 and 6, the cover 6 is folded, but the entire cover 6 is moved forward to prevent the twist of the cover 6. Thus, the cover 6 is folded without disturbance. Accordingly, the appearance of the seat 1 is improved.

In the seat 1 configured as above, the lower edge part 6a of the cover 6 is held in the finisher 5 by engaging the slit 24 and the pin 25. The finisher 5 can be extended beyond the both ends of the lower side frame 10 along the lower side frame 10, and the slit 24 also can be extended according to the extension of the finisher 5. In this regard, the range shielded by the cover 6 can be enlarged by extending the cover 6 along the lower side frame 10, and the turning-up of the cover 6 also can be suppressed by reliably holding the lower edge part 6a of the extended cover 6. Accordingly, it can be prevented that the hand of the occupant or the like is inserted into between the side portion 2a of the seat cushion 2 and the finisher 5 covering the lower side frame 10.

The lower side frame 10 is covered over the entire length with the finisher 5. Accordingly, although the seat cushion 2 is lifted, the end part of the lower side frame 10 is not exposed so as to remove or reduce the feeling of danger which the occupant feels when the end part of the lower side frame 10 is exposed.

Figure 7:
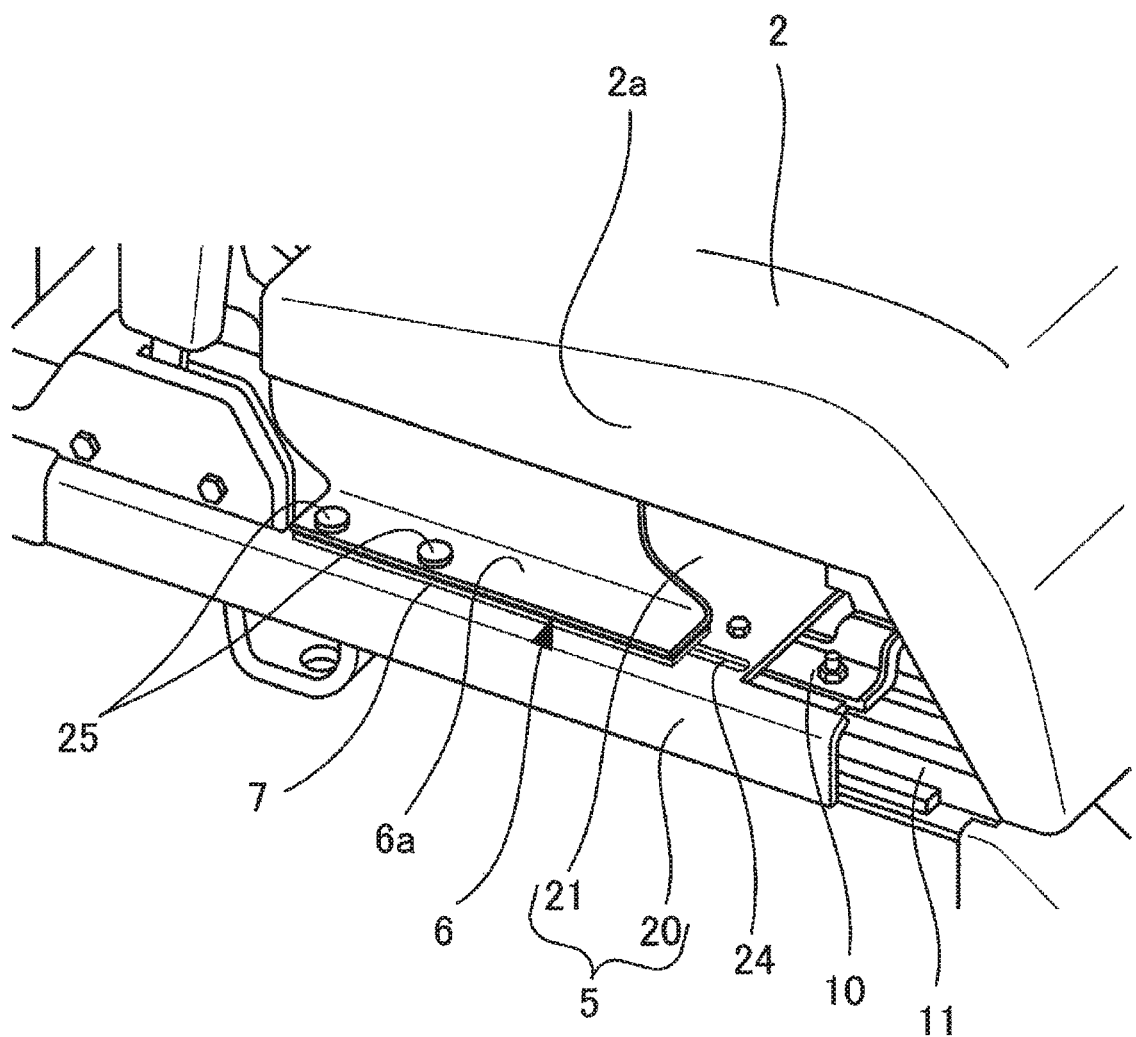
FIG. 7 is a perspective view illustrating a modification of the seat of FIG. 1.

Incidentally, as illustrated in FIG. 7, a reinforcement plate 7 may be provided in the lower edge part 6a of the cover 6. The reinforcement plate 7 is a rigid member made of a resin material. The reinforcement plate 7 extends over the entire length of the lower edge part 6a in the seat front-and-rear direction, and is joined with the lower edge part 6a of the cover 6 by sewing, for example. The turning-up of the cover 6 can be further reliably suppressed by providing the reinforcement plate 7 in the lower edge part 6a.

Preferably, the reinforcement plate 7 is provided in the opposing surface of the lower edge part 6a to the finisher 5. In a case where a fiber sheet such as non-woven cloth is used in the cover 6, it can be prevented that a fiber is jammed between the slit 24 and the pin 25, and the cover 6 can be moved smoothly. A resin, which is excellent in an abrasion resistance and a sliding performance as well as a mechanical strength, such as PP resin (Polypropylene resin), POM resin (Polyoxymethylene resin, Polyacetal resin), and PA resin (Polyamide resin) is proper as a resin material forming the reinforcement plate 7.

Figure 8:
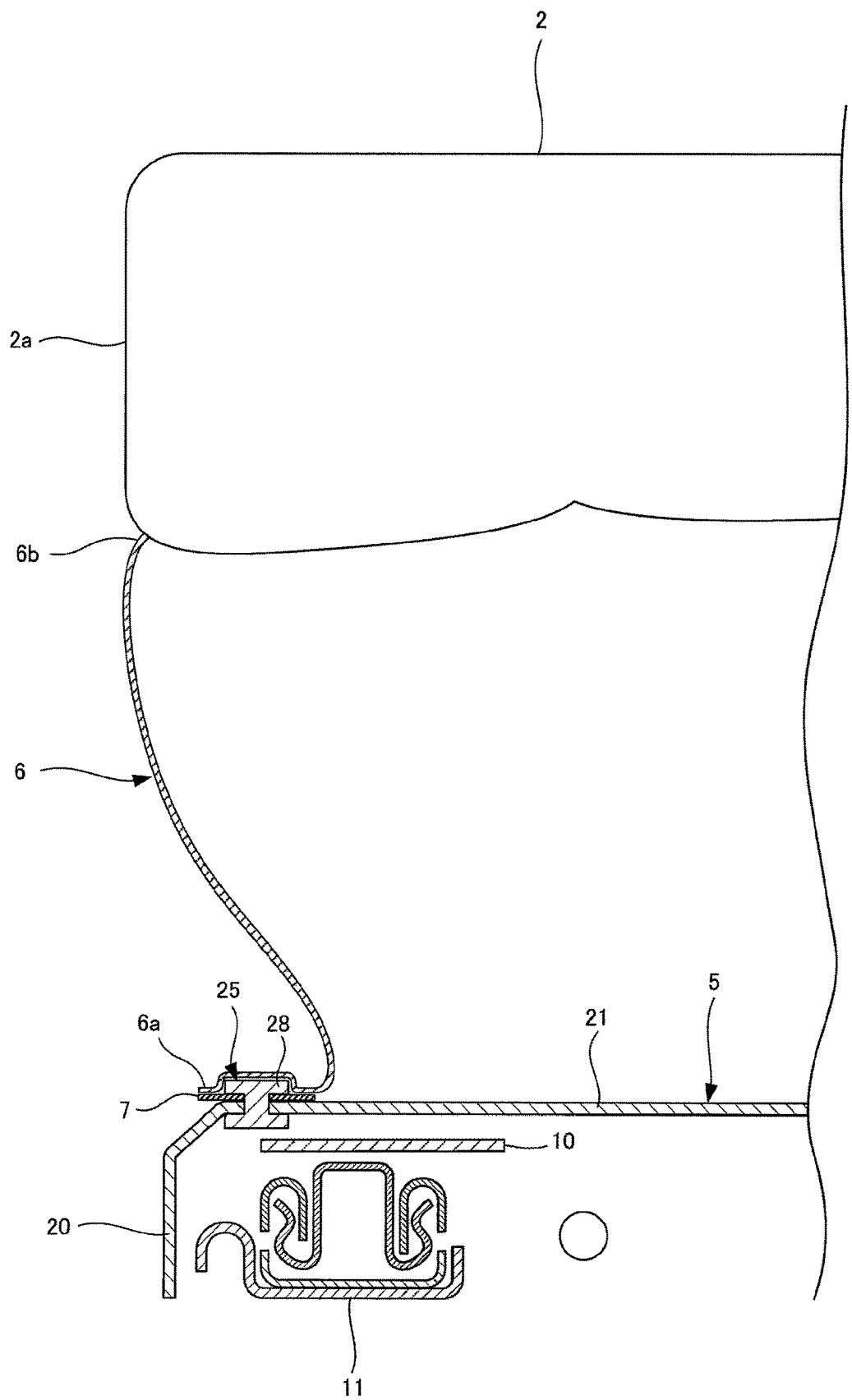
FIG. 8 is a sectional view of another modification of the seat of FIG. 1.

In a case where the reinforcement plate 7 is provided in the opposing surface of the lower edge part 6a of the cover 6 to the finisher 5, as illustrated in FIG. 8, the pin 25 may be attached in the reinforcement plate 7, so that a head part 28 of the pin 25 arranged on the reinforcement plate 7 is covered with the lower edge part 6a of the cover 6. In this case, the pin 25 is not exposed, and thus, the appearance of the seat 1 can be improved. The lower edge part 6a of the cover 6 and the reinforcement plate 7 are joined by adhering and the like.

FIGS. 9, 10, 11, and 12 illustrate a modification of the cover 6.

Figure 9:
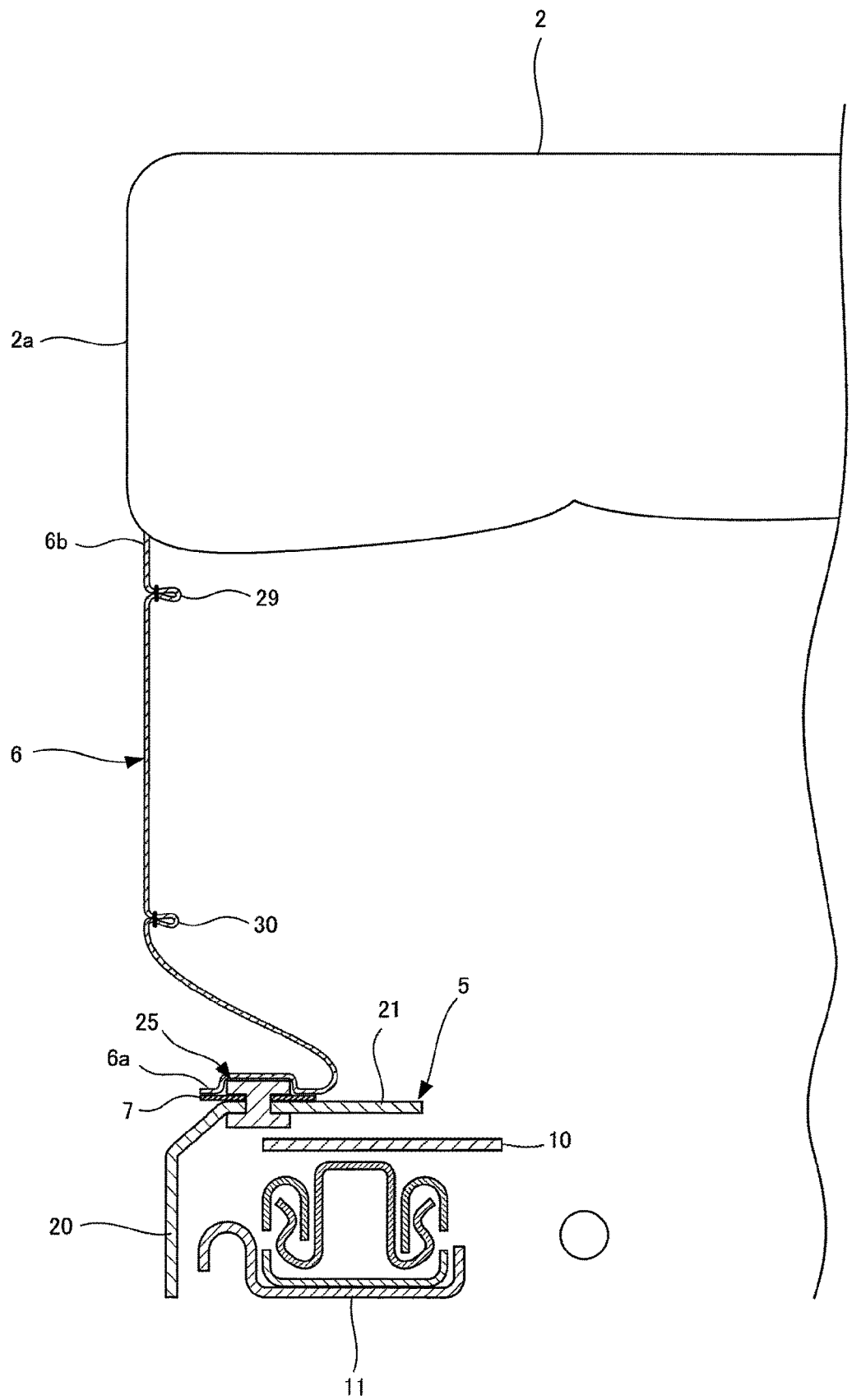
FIG. 9 is a sectional view of a modification of the cover of the seat of FIG. 1.
Figure 10:
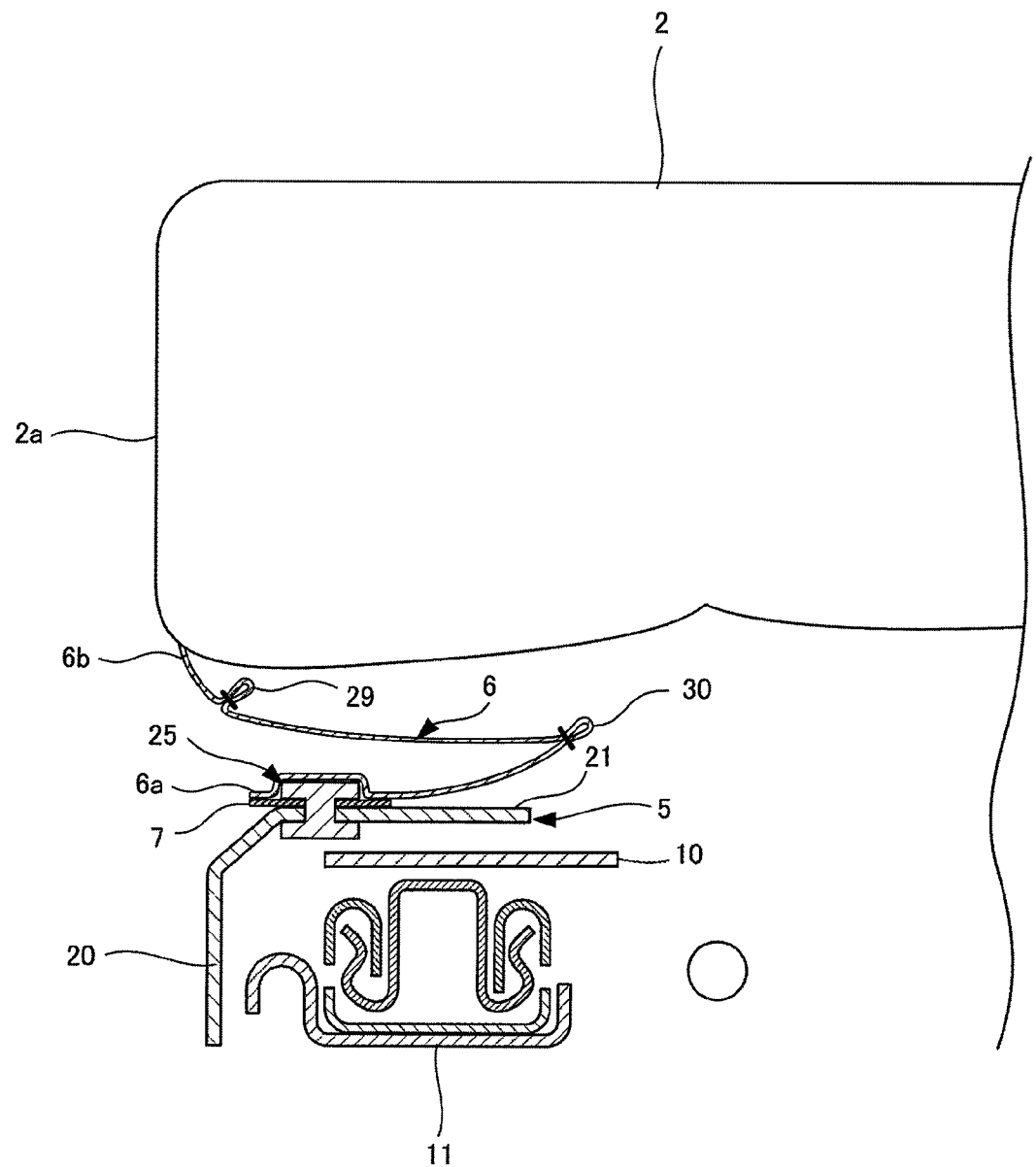
FIG. 10 is a sectional view illustrating a folded state of the cover of FIG. 9.

Two of a folding part 29 and a folding part 30 which extend substantially in parallel with the seat front-and-rear direction are provided in the cover 6 illustrated in FIGS. 9 and 10. The folding part 29 and the folding part 30 are formed in such a manner that a pleat is gathered in the cover 6, and the gathered pleat is immobilized by sewing and the like. Further, in this example, the folding part 29 arranged on the seat cushion 2 and the folding part 30 arranged on the finisher 5 are formed such that the pleat swells toward the inside of the cover 6, that is, swells toward between the seat cushion 2 and the finisher 5. Incidentally, in this example, the finisher 5 is divided in the seat width direction to be provided in each of the lower side frames 10.

When the cover 6 is folded in accordance with the descent of the seat cushion 2, the cover 6 is folded along the folding part 29 and the folding part 30. As illustrated in FIG. 10, the cover 6 is folded such that the folding part 29 and the folding part 30 are housed between the seat cushion 2 and the finisher 5. As described above, the folding parts are provided in the cover 6, so that the cover 6 can be folded as intended, and the appearance of the seat 1 can be improved.

Figure 11:
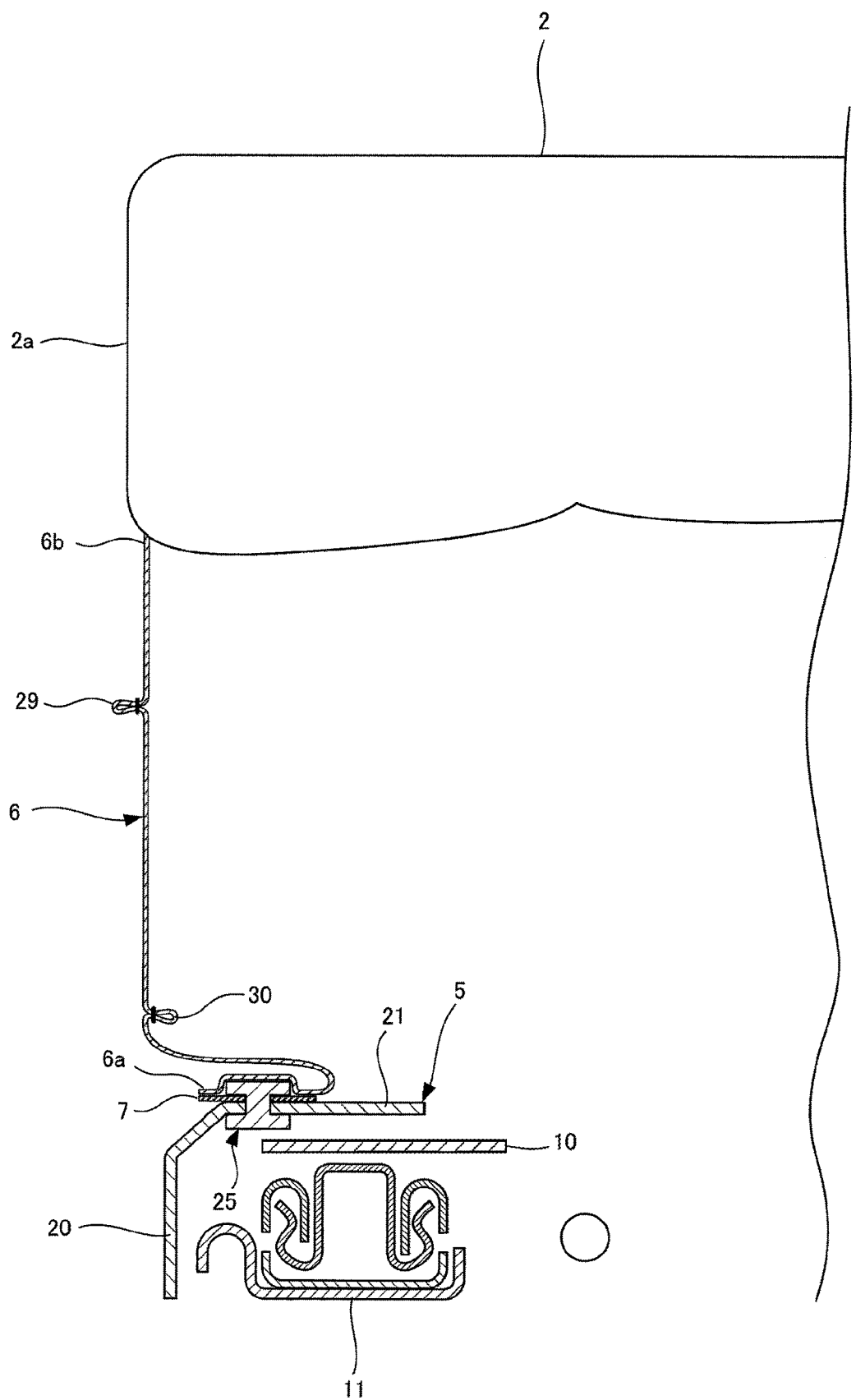
FIG. 11 is a sectional view illustrating another modification of the cover of the seat of FIG. 1.
Figure 12:
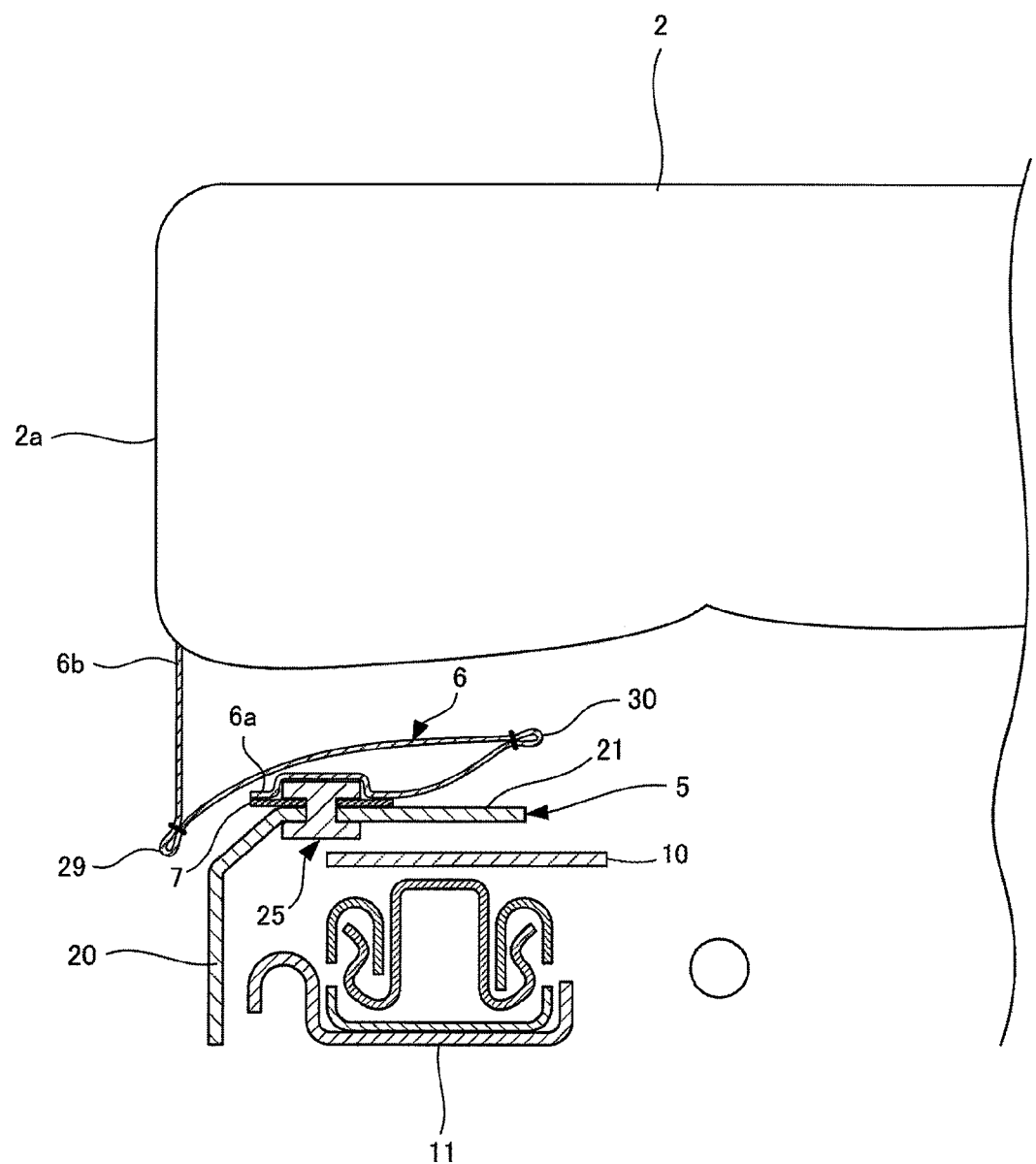
FIG. 12 is a sectional view illustrating a folded state of the cover of FIG. 11.

In the cover 6 illustrated in FIGS. 11 and 12, the folding part 29 arranged on the seat cushion 2 is formed such that the pleat swells toward the outside of the cover 6, and the folding part 30 arranged on the finisher 5 is formed such that the pleat swells toward the inside of the cover 6. In this case, as illustrated in FIG. 12, when the cover 6 is folded in accordance with the descent of the seat cushion 2, the cover 6 is folded such that the folding part 29 which swells toward the inside of the cover 6 is covered with the side plate part 20 of the finisher 5. Accordingly, the pin 25 is not exposed, and thus the appearance of the seat 1 can be improved.

Figure 13:
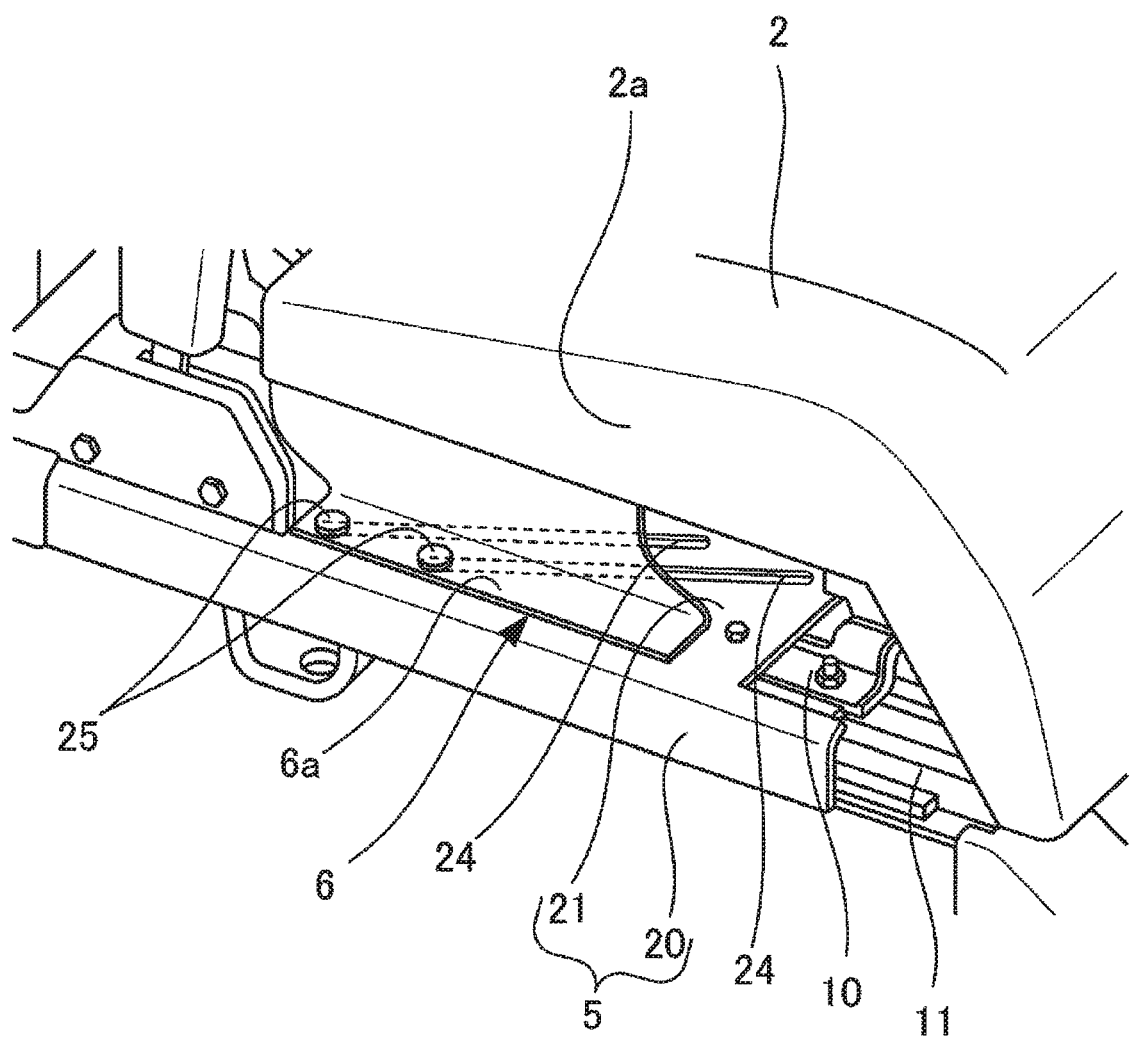
FIG. 13 is a perspective view illustrating still another modification of the seat of FIG. 1.

Hereinbefore, the advancing and retreating direction in which the seat cushion 2 advances and retreats along the floor F in conjunction with the lifting and lowering is described as the seat front-and-rear direction. However, the advancing and retreating direction may intersect with the seat front-and-rear direction. In this case, as illustrated in FIG. 13, the plural slits 24 of the finisher 5 are provided in the top plate part 21, and extend in parallel with the advancing and retreating direction of the seat cushion 2 intersecting with the seat front-and-rear direction. Further, one pin 25 is engaged in each of the slits 24. Accordingly, the lower edge part 6a of the cover 6 extending in the seat front-and-rear direction can be guided in the advancing and retreating direction of the seat cushion 2 intersecting with the seat front-and-rear direction, and in the lifting and lowering of the seat cushion 2 and the advance and the retreat interlocking with the lifting and lowering, the twist of the cover 6 can be prevented, and the cover 6 can be folded without disturbance.

The slit 24 may be provided in the side plate part 20 of the finisher 5. However, in this case, the extending direction of the slit 24 is not limited to the seat front-and-rear direction which is along the lower side frame 10. With respect thereto, in a case where the slit 24 is provided in the top plate part 21 of the finisher 5, the extending direction of the slit 24 may be set as a direction intersecting with the seat front-and-rear direction as well as the seat front-and-rear direction.

Figure 14:
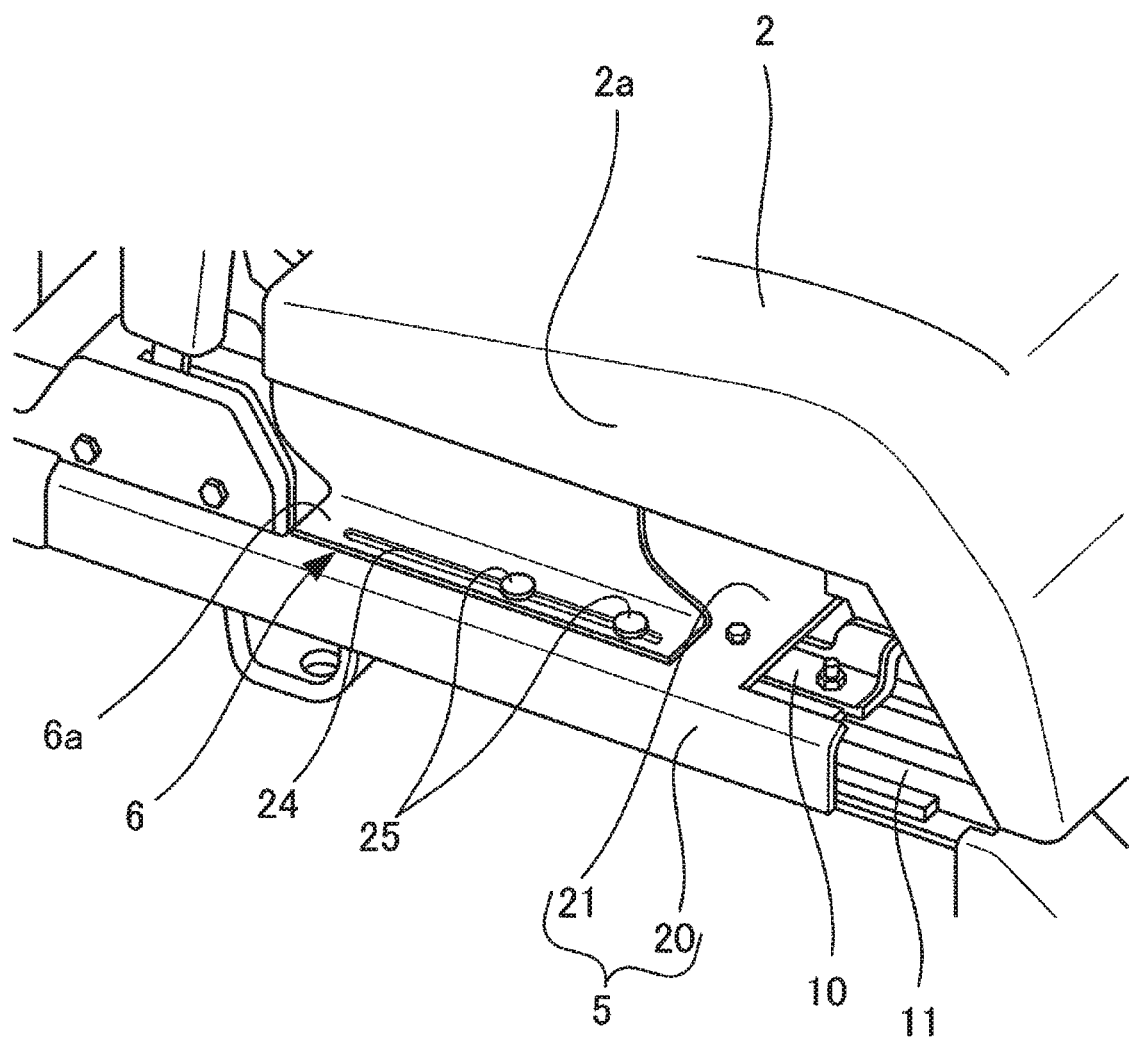
FIG. 14 is a perspective view illustrating still further another modification of the seat of FIG. 1.

As described above, the slit 24 is provided in the finisher 5, and the plurality of pins 25 are provided in the cover 6. However, as illustrated in FIG. 14, the plurality of pins 25 of the finisher 5 may be provided, and the slit 24 may be provided in the lower edge part 6a of the cover 6.

The guiding part of the finisher 5 and the guided part of the lower edge part 6a of the cover 6 are not limited to the combining of the slit 24 and the plurality of pins 25, and may be configured in such a manner that a rail having an undercut in the sectional surface is combined with a plurality of hooks which are engaged with the undercut and grip the rail, for example.

The seat 1 is not limited to the seat mounted in the vehicle such as an automobile, and may be applied to another vehicle seat such as an airplane and a ship other than the vehicle.

Hereinbefore, as described above, the seat disclosed in this specification includes: a seat cushion; a lower frame which supports the seat cushion to be lifted and lowered and to be advanced and retreated along a floor in conjunction with the lifting and lowering; a finisher which covers a lower side frame, which is arranged between a side portion of the seat cushion and the floor, of the lower frame; and a flexible cover which is hung from the side portion of the seat cushion such that a lower edge part is engaged in the finisher, and is expanded and folded in accordance with the lifting and lowering of the seat cushion. The finisher includes a guiding part which guides the lower edge part of the cover to be movable in an advancing and retreating direction of the seat cushion, and the lower edge part of the cover includes a guided part which is engaged with the guiding part to be movable in the advancing and retreating direction of the seat cushion.

In the seat disclosed in this specification, the finisher includes a top plate part which covers the lower side frame, and the guiding part of the finisher is provided in the top plate part.

In the seat disclosed in this specification, the advancing and retreating direction of the seat cushion intersects with a seat front-and-rear direction.

In the seat disclosed in this specification, the lower edge part of the cover includes a reinforcement plate which extends over an entire length of the lower edge part in the seat front-and-rear direction.

In the seat disclosed in this specification, the reinforcement plate is provided in an opposing surface of the lower edge part to the finisher.

In the seat disclosed in this specification, the guiding part of the finisher includes any one of a slit which extends in the advancing and retreating direction of the seat cushion and a pin which is engaged with the slit to be movable in a longitudinal direction of the slit, and the guided part of the cover includes the other of the slit and the pin.

What is claimed is:

1. A vehicle seat comprising:
a seat cushion;
a lower frame which is supported by a slide rail structure and which supports the seat cushion to be lifted and lowered and to be advanced and retreated along a floor in conjunction with the lifting and lowering, the lower frame including a lower side frame arranged between a side portion of the seat cushion and the floor;
a finisher which covers the lower side frame; and
a flexible cover which is hung from the side portion of the seat cushion such that a lower edge part of the cover is engaged in the finisher, and is expanded and folded in accordance with the lifting and lowering of the seat cushion, wherein:
the lower side frame is provided between the finisher and the slide rail structure;
the finisher includes a guiding part which guides the lower edge part of the cover to be movable in an advancing and retreating direction of the seat cushion; and
the lower edge part of the cover includes a guided part which is engaged with the guiding part to be movable in the advancing and retreating direction of the seat cushion.

2. The vehicle seat according to claim 1, wherein:
the finisher includes a top plate part which covers the lower side frame; and
the guiding part of the finisher is provided in the top plate part.

3. The vehicle seat according to claim 2, wherein the advancing and retreating direction of the seat cushion intersects with a seat front-and-rear direction.

4. The vehicle seat according to claim 1, wherein the lower edge part of the cover includes a reinforcement plate which extends over the entire length of the lower edge part in the seat front-and-rear direction.

5. The vehicle seat according to claim 4, wherein the reinforcement plate is provided in an opposing surface of the lower edge part to the finisher.

6. The vehicle seat according to claim 1, wherein:
the guiding part of the finisher includes any one of a slit which extends in the advancing and retreating direction of the seat cushion and a pin which is engaged with the slit to be movable in a longitudinal direction of the slit; and
the guided part of the cover includes the other of the slit and the pin.

* * * * *